(12) United States Patent
Bunsendal et al.

(10) Patent No.: US 12,007,737 B2
(45) Date of Patent: Jun. 11, 2024

(54) SAFETY-DIRECTED CONTROL SYSTEM

(71) Applicant: Schneider Electric Industries SAS, Rueil-Malmaison (FR)

(72) Inventors: Jens Bunsendal, Wuerzburg (DE); Maximilian Lankl, Hasloch (DE); Maximilian Eugen Stahl, Karbach (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 183 days.

(21) Appl. No.: 17/304,323

(22) Filed: Jun. 18, 2021

(65) Prior Publication Data
US 2022/0004157 A1    Jan. 6, 2022

(30) Foreign Application Priority Data

Jun. 19, 2020   (EP) .................................... 20305670

(51) Int. Cl.
*G05B 19/042*     (2006.01)
*G05B 19/048*     (2006.01)

(52) U.S. Cl.
CPC ....... *G05B 19/0425* (2013.01); *G05B 19/048* (2013.01)

(58) Field of Classification Search
CPC .............. G05B 19/0425; G05B 19/048; G05B 2219/25232; G05B 9/02
See application file for complete search history.

(56) References Cited

U.S. PATENT DOCUMENTS

| | | | |
|---|---|---|---|
| 6,704,899 B1 * | 3/2004 | Dold | H04L 1/00 714/752 |
| 2004/0260408 A1 * | 12/2004 | Scott | G05B 23/0213 700/20 |

(Continued)

FOREIGN PATENT DOCUMENTS

| | | |
|---|---|---|
| DE | 198 40 562 A1 | 3/2000 |
| DE | 10 2012 102 187 B3 | 7/2013 |

(Continued)

OTHER PUBLICATIONS

Extended European Search Report issued Nov. 26, 2020 in corresponding European Patent Application No. 20305670.0 (with English Translation of Category of Cited Documents), 10 pages.

*Primary Examiner* — Kenneth M Lo
*Assistant Examiner* — Mohammed Shafayet
(74) *Attorney, Agent, or Firm* — Oblon, McClelland, Maier & Neustadt, L.L.P.

(57) ABSTRACT

A safety-directed control system comprises at least one safety sensor unit and at least one safety actuator unit, which are connected to one another via a fieldbus, and a programming device. Sensor connections for connecting safety sensors to the fieldbus are provided by the at least one safety sensor unit, the sensor connections being associated with safety lines. The programming device displays the available safety lines to a user via an output interface and receives a user input via an input interface, with the user input associating a selected safety response, which is executable by the safety actuator unit, with at least one selected safety line. The programming device further stores the association between the selected safety line and the selected safety response in the safety actuator unit as a safety configuration.

20 Claims, 7 Drawing Sheets (56) References Cited

U.S. PATENT DOCUMENTS

| | | | | |
|---|---|---|---|---|
| 2009/0222112 A1* | 9/2009 | Moddemann | ..... | H04L 12/40006 700/79 |
| 2011/0071654 A1* | 3/2011 | Schmidt | ............ | G05B 19/0428 700/79 |
| 2015/0045915 A1* | 2/2015 | Schmidt | ................. | H04L 67/10 700/79 |
| 2016/0259313 A1* | 9/2016 | Liu | ...................... | G06F 3/0484 |

FOREIGN PATENT DOCUMENTS

| | | |
|---|---|---|
| EP | 2 302 472 A2 | 3/2011 |
| WO | WO 98/44469 A2 | 10/1998 |

\* cited by examiner

SAFETY-DIRECTED CONTROL SYSTEM

The present invention relates to a safety-directed control system and to a method of operating a safety-directed control system.

Safety-directed control systems are used in process and automation engineering to safeguard hazardous system parts and thus prevent injury to persons or material damage. For this purpose, so-called safety functions are usually used that are triggered by means of safety-directed sensors, for example by means of emergency stop buttons, light barriers or the like. On the execution of the safety functions, the hazardous system parts are transferred to a safe state, for example shut down or operated in a safe parameter range that excludes a hazard. The transfer to the safe state by means of the safety function in this respect represents a safety-directed response or a safety response.

The execution of the safety functions usually takes place in such a secured manner that malfunctions cause an automatic fallback to a safe state of the hazardous system part. Permitted safety functions and their designs are specified in various national and international standards.

For the execution of the safety functions, safety-directed control systems usually have safety-directed actuators, which execute the safety responses, in addition to the safety-directed sensors. Such actuators can, for example, be configured as contactors, which interrupt an energy supply to the hazardous system part, or as safeguarded drives that limit a position and/or a movement of the hazardous system part to a safe parameter range. Safety responses that can inter alia be executed by drives are, for example, an uncontrolled stop (STO—safe torque off), an operation at a safely limited speed (SLS—safely limited speed), or a safely controlled stop.

A technical signal linking of the safety-directed sensors and actuators for the execution of safety functions is inter alia implemented by means of hard-wired safety relays in which the individual actuators are connected to the sensors used for triggering by means of separate lines in each case. However, such a solution is very inflexible and requires a high wiring effort. In addition, the system can only with a great effort be subdivided into regions having different safety requirements and safety responses.

In addition to hard-wired safety relays, a use of dedicated safety controls is also possible that are connected to the safety-directed sensors and actuators of a system or of a system region, for example via a fieldbus, and that control the safety-directed actuators on the basis of logical links of input signals provided by the safety-directed sensors. Such safety controls usually require a complex and/or expensive programming and validation of the logical links. In addition, the data transmission between the central safety control, on the one hand, and the safety-directed sensors and actuators, on the other hand, requires a communication channel with a sufficiently large bandwidth.

It is an object of the invention to improve a safety-directed control system and a method of operating a safety-directed control system inter alia to the extent that safety functions can be configured and executed simply and safely.

This object is satisfied by a safety-directed control system and a method of operating a safety-directed control system in accordance with the independent claims. Further developments are respectively set forth in the dependent claims.

A safety-directed control system is specified comprising at least one safety sensor unit and at least one safety actuator unit, which are connected to one another via a fieldbus, and a programming device. Sensor connections for connecting safety sensors to the fieldbus are provided by the at least one safety sensor unit, wherein the sensor connections are associated with safety lines. The programming device is configured to display the available safety lines to a user via an output interface and to receive a user input of the user via an input interface, with the user input associating a selected safety response, which is executable by the safety actuator unit, with at least one selected safety line. The programming device is further configured to store the association between the selected safety line and the selected safety response in the safety actuator unit as a safety configuration. The safety lines associated with the individual sensor connections can be independently activated by the at least one safety sensor unit by transmitting line activation signals of the individual safety lines via the fieldbus. The safety actuator unit is configured to receive the line activation signals via the fieldbus directly from the at least one safety sensor unit and, on the reception of a line activation signal of an activated safety line, to independently execute the safety response stored for the activated safety line in the safety configuration.

In such a safety-directed control system, the individual safety responses of the safety actuator unit connected to the fieldbus are therefore not controlled by a central safety control, but are triggered directly in the safety actuator unit by the at least one safety sensor unit by means of the safety lines via the fieldbus. In this respect, the link logic required for executing the safety responses is stored in the form of the safety configuration in a decentralized manner in the safety actuator unit and the safety actuator unit executes the associated safety responses independently, that is without the involvement of an interposed control unit, when it receives the line activation signals via the fieldbus directly from the at least one safety sensor unit. The safety lines that can be activated by the at least one safety sensor unit via the fieldbus therefore each form direct fixed-position wirings or links between the safety actuator unit and the sensor connections of the at least one safety sensor unit that are each associated with the individual safety lines.

Such a direct triggering of safety responses by means of preconfigured safety lines via a fieldbus reduces the bandwidth on the fieldbus that is required for the implementation of the safety responses since only a single line activation signal has to be transmitted via the fieldbus for each safety line and can then directly trigger a safety response in generally any desired number of safety actuator units. For example, it is thus not necessary to generate a separate output signal for each safety actuator unit, which is addressed by an activated safety line, or for each safety response and to transmit said separate output signal via the fieldbus.

In the claimed safety-directed control system, the safety responses executed by the safety actuator unit can be defined by a simple configuring of the safety actuator unit by associating safety responses of the safety actuator unit with the individual safety lines in each case and subsequently storing them as a safety configuration in the safety actuator unit. In this respect, a complex and/or expensive creation of a control program can be omitted that maps all the safely responses of the safety-directed control system and that would, for example, be required for a central safety control. In this respect, the effort and the error proneness are therefore reduced on the putting into operation of the control system. In addition, the maintenance effort is reduced in ongoing operation since in the case of changes to the safety-directed control system, for example on the addition or removal of individual safety actuator units or safety sensor units, only individual configurations have to be changed, but not a complex control program.

The outputting of the available safety lines via the output interface of the programming device and the configuring of the safety response to associate the safety response and the safety line by means of a user input via the input interface have the technical effect of providing a user interface that enables a simple and safe configuring of the safety response. Thus, such a user interface replicates the separate wiring of a safety relay that is already known to the skilled person, that has individual safety sensors, and that is thus adapted in a particular manner to the concept of individual safety circuits that is known to the skilled person. This also enables inexperienced users to configure the control system quickly and easily in a safety-directed manner.

For example, the safety lines displayed via the output interface replicate individual safety circuits to which the user can "connect" the safety actuator unit by means of the user input received via the input interface. In this respect, extended configuration options result compared to a hard-wiring in that any desired safety response executable by the safety actuator unit can be associated with the safety line. Such a safety response can, for example, also comprise a safely limited speed (SLS) or a safely controlled stop (SS1/SS2) and is thus not limited to a safe uncontrolled stop (STO) such as would be the case with a simple safety relay, for example.

In addition to the claimed safety actuator unit, the safety-directed control system can comprise further safety actuator units that are connected to the fieldbus and that are configured in the same way as the claimed safety actuator unit. In this respect, the programming device can receive at least one user input for each safety actuator unit via the input interface, said user input associating a selected safety response executable by the respective safety actuator unit with at least one safety line and the individual associations between the safety lines and the safety responses can be stored in the individual safety actuator units as safety configurations in each case. In this respect, the safety responses associated with the individual safety actuator units can differ from one another.

The claimed at least one safety sensor unit can have a single sensor connection or a plurality of sensor connections. In particular in cases in which the claimed at least one safety sensor unit has only a single sensor connection, but also in all other cases, the safety-directed control system can comprise further safety sensor units in addition to the claimed at least one safety sensor unit. In this respect, the individual safety sensor units each have at least one safe sensor connection for connecting safety sensors to the fieldbus, wherein the safety sensors can, for example, be emergency stop buttons, light barriers, light grids, temperature sensors or the like. The safety sensor units then convert sensor signals of the safety sensors into the line activation signals, that is the safety sensor units transmit the line activation signal associated with the sensor connection via the fieldbus on the triggering of a safety sensor connected to one of the safe sensor connections of the safety sensor units.

The individual sensor connections of the safety sensor units connected to the fieldbus can each be associated with different safety lines. Alternatively, a plurality of sensor connections of the safety sensor units connected to the fieldbus can, however, also be associated with a single safety line so that the line activation signal associated with the single safety line is transmitted via the fieldbus, irrespectively of which of the safety sensors connected to the plurality of sensor connections is activated. Sensor connections that are associated with the same safety line can be formed in a single safety sensor unit or in respective different safety sensor units.

An association of individual sensor connections with the safety lines can in this respect depend on the sensor type and/or on the spatial arrangement of the safety sensors connected to the individual sensor connections. For example, all the sensor connections to which safety sensors of the same sensor type, for example emergency stop buttons, are connected, and/or sensor connections whose safety sensors safeguard the same protected region, and/or sensor connections that are formed at the same safety sensor unit can be associated with the same safety line.

The individual sensor connections of the safety sensor units connected to the fieldbus can each be associated with exactly one safety line. Alternatively, individual sensor connections can also be associated with a plurality of safety lines so that more than one line activation signal is transmitted via the fieldbus on an activation of the safety sensors connected to the respective sensor connections.

The line activation signal can be transmitted as a binary signal via the fieldbus. Such a binary line activation signal indicates in a particularly simple and data-saving manner whether the associated safety line has been activated or not.

The at least one safety sensor unit can be configured to perform a failsafe preprocessing of safety sensor data received via a safe sensor connection in order to decide whether the safety line with which the safe sensor connection is associated is to be activated and the corresponding line activation signal is to be transmitted. The safety sensor data can, for example, be analog or digital data. The safety sensor data may vary within a data range that comprises more than two states. For example, the safety sensor data can be a speed or a rotational speed of a machine influenced by the safety-directed control system.

The safety sensor data can be checked on the failsafe preprocessing based on a criterion or based on a plurality of criteria, for instance based on one threshold value or based on a plurality of threshold values, to determine whether they are in a safe value range and the safety line can be activated if the safety sensor data is lie outside the safe value range. The safe value range can, for example, be a predefined permitted speed range or rotational speed range of the controlled machine. The preprocessing can, for example, take place in a failsafe manner in that it is performed in a redundant manner.

The failsafe preprocessing of the safety sensor data can also comprise a fault check of a circuit generating the safety sensor data. Such a fault check can, for example, comprise a short circuit check or a ground fault check. In this case, the safe value range can, for example, be formed by a safe resistance range or impedance range of the circuit. The fault check can also comprise a functional check of a safety sensor present in the circuit, wherein the safe value range is formed by safety sensor data indicating an operability of the safety sensor.

The safety actuator units serve to connect safe actuators to the fieldbus, wherein the safe actuators can, for example, be drives, relays, valves or the like. The safety actuator units control the safety actuators in accordance with the control signals received via the fieldbus and in this respect set the actuators into a safe state, which is defined by the safety response associated with the line activation signal, on the reception of a line activation signal.

The safety actuator units can have a failsafe safety module, for example a safety module of a redundant design, for executing the safety response. The safety module can be formed separately in a technical safety aspect from a non-failsafe standard module of the safety actuator unit controlled by a standard control unit of the safety-directed control system. The failsafe safety module can, for example, be formed by means of failsafe hardware and/or by means of failsafe software.

The safety module can receive the line activation signals autonomously and independently of the standard module from the at least one safety sensor unit via the fieldbus. The safety module can, for example, have its own fieldbus address and/or can be connected to the fieldbus by means of its own bus interface. The safety response can comprise the safety module monitoring output signals, which are output by the standard module, in a failsafe manner within the safety actuator unit. In the event of a safety-critical deviation of the output signals from a safe signal parameter range, the safety module can then set the associated output into a safe state, for example switching off.

The fieldbus can be an Ethernet-based fieldbus, for example a real-time Ethernet-based fieldbus, for example a SERCOS fieldbus, for instance a SERCOS III fieldbus. The fieldbus can also be configured as a UPC UA over TSN network.

The safety sensor units and the safety sensors as well as the safety actuator units and the safety actuators can each be configured as failsafe, for example by means of diversity, redundancy, and/or by utilizing the closed-circuit principle. The transmission of the line activation signals via the fieldbus can take place by means of a failsafe transmission protocol, for example by means of CIP safety. The failsafe transmission protocol can implement measures for safeguarding the data signals transmitted via the fieldbus, for example time stamps and time expectation, message IDs, safety checksums, redundant messages or the like.

The programming device can be connected to the safety sensor units and the safety actuator units via the fieldbus. The programming device can in this respect be connected directly into the fieldbus or connected to the fieldbus via a central control unit, for example a non-safe standard control unit. The programming device can be configured to store the safety configurations in the safety actuator units by means of transmission via the fieldbus.

The programming device can be designed as a software module that is executed on a data processing unit, for instance a computer, connected to the fieldbus. The programming device can be executed as a software module, but can also be executed on a standard control unit of the control system. The output interface and/or the input interface can be physical interfaces, for instance for connecting a display device, such as a screen, or an input device, such as a keyboard. The output interface and/or the input interface can also be remote access interfaces, for instance network interfaces, that can be accessed via a network by means of a separate user device.

The programming device can be configured to query the safety sensor units connected to the fieldbus directly via the fieldbus. However, it can also receive information on the available safety sensor units from another unit connected to the fieldbus, for example from a non-safe standard control unit or a master unit. The programming device can be configured to also display, in addition to the available safety lines, the safety responses executable by the safety actuator unit via the output interface, for example as selection lists linked to the individual safety lines.

In accordance with an embodiment, the safety responses executable by the safety actuator unit are stored in the safety actuator unit and can be invoked by the programming device for selection by the user, for example via the fieldbus. It can thereby be ensured in a simple and safe manner that the user only selects safety responses that are also executable by the connected safety actuator unit. In alternative embodiments, the safety responses can also be stored in the programming device itself. Irrespective of the location of the storage, the safety responses can each be stored in a database.

In accordance with an embodiment, the safety responses of the safety actuator unit selectable by means of the user input are stored as parameterizable program modules. The storage of the safety responses as parameterizable program modules enables a particularly safe and efficient creation of the safety configurations since only individual parameters can be changed by the user and have to be checked in a technical safety aspect. To further increase the safety, the program modules can be stored in a safeguarded manner, for example by means of a checksum. Changes to the program modules that endanger safety can thereby be recognized and prevented. In addition, the program modules can be configured to only be parameterized in predefined safe parameter ranges. The parameter ranges, like the program modules themselves, can in this respect be stored in a safeguarded manner.

In accordance with an embodiment, the programming device is configured to display, after the selection of the safety response, configuration parameters of the selected safety response, which can be changed by the user, to the user via the output interface and to receive a further user input via the input interface, wherein the further user input assigns at least one of the displayed configuration parameters to the selected safety response. This enables a particularly simple and safe configuring of the safety response.

In accordance with an embodiment, the programming device is configured to receive, via the input interface, a user input for selecting the safety actuator unit connected to the fieldbus and to display the available safety lines and the safety responses executable by the selected safety actuator unit to the user via the output interface. The safety actuator unit can, for example, be selected from all the safety actuator units connected to the fieldbus by means of the user input for selecting the safety actuator unit. This enables a simple and clear configuring of the safety actuator units. By displaying the available safety lines and the safety responses executable by the selected safety actuator unit to the user in the output interface after the selection, a simple and error-free association of the safety responses with the individual safety lines is made possible and the error proneness of configuring is further reduced.

In accordance with an embodiment, the programming device is configured to receive, via the input interface, user inputs for programming a non-safe standard control program of a non-safe standard control unit connected to the fieldbus, wherein the programming device is further configured to execute the programming of the standard control program and to execute a safety configuring fix creating the safety configuration by means of separate programming modules and/or to display them in separate output regions via the output interface.

A programming of the standard control program via the programming device, which is also used for the safety configuring, simplifies the total configuring of the safely-directed control system. Since the programming of the standard control program and the safety configuring are executed in separate programming modules or displayed in separate output regions, a separation of a non-safety, critical programming and a safety-relevant safety configuring is achieved and the safety is thus increased on the configuring of the total control system.

The safety configuring can take place by means of a safety programming module that checks the selection and/or parameterization of the safety responses in a technical safety aspect and, for example, checks and validates the parameterizable program modules used for the safety configuring. The separate output regions can, for example, be separate display elements such as windows, tabs or the like that can, for example, only he alternately displayable.

In accordance with an embodiment, the programming device is configured to only store the selected safety response in the safety actuator unit when the programming device has received a user input having a user-defined selection for each safety line. It can thereby be ensured that a behavior of the safety actuator unit is predetermined for each safety line and that no undefined states can occur during the operation of the safety-directed control system. The user-defined selection can, for example, specify a safety response or also determine that no safety response should take place, that is the safety actuator unit should not be linked to the respective safety line.

In accordance with an embodiment, an association of one sensor connection or a plurality of sensor connections of the safety sensor unit with the safety lines is stored in the safety sensor unit. In general, the association of each individual sensor connection with the safety lines can in each case he stored in the safety sensor unit comprising the respective sensor connection. It can thereby be ensured reliably and without the need for a user intervention that a safety line is associated with each sensor connection and is then also displayed during the subsequent safety configuring. The programming device can be configured to query the stored safety lines from the safety sensor units, for example via the fieldbus, for instance directly via the fieldbus or via a standard control unit or master unit connected to the fieldbus and in connection with the programming device.

Since the association of the sensor connection with the safety line is stored in the safety sensor unit, the individual safety sensor units can also be provided and/or delivered preconfigured. The safety-directed control system, the safety sensor unit, and/or the safety actuator unit can be configured to put the safety lines into operation in an independent and automated manner, in particular without the need for a user input, after the connection of the safety sensor unit and the safety actuator unit to the fieldbus. This can be made possible in that the association of the sensor connections with the individual safety lines is stored in the safety sensor unit and the safety responses associated with the individual safety lines or line activation signals are stored as safety configurations in the safety actuator unit.

The programming device can be configured to change the association, which is stored in the safety sensor unit, between sensor connections and safety lines on the basis of user inputs. For this purpose, the programming device can be configured to represent the individual sensor connections of the safety sensor units, which are connected to the fieldbus, by means of unique identifiers via the output interface. Such unique identifiers can, for example, each comprise a part identifier, which designates one of the safety sensor units, and a further part identifier that designates an individual sensor connection of the respective safety sensor unit.

The safety sensor unit and the programming device can be configured to transfer the associations, which are stored in the safety sensor unit, of the individual sensor connections with the safety lines to the programming device via the fieldbus. This can, for example, take place as soon as a connection has been established between the safety sensor unit and the programming device via the fieldbus. The programming device can be configured to store a changed association of the individual sensor connections of a safety sensor unit with the safety lines in the respective safety sensor unit by means of transmission via the fieldbus. The changed association of the individual sensor connections with the safety lines can, for example, have taken place on the basis of a user input, for instance via the input interface.

The safety-directed control system can be configured, on the putting into operation, to perform a comparison between the associations, which are stored in the individual safety sensor units, of the sensor connections with the individual safety lines and user-defined associations of the sensor connections with the individual safety lines. Such a user-defined association of the sensor connections with the individual safety lines can also be designated as a line configuration. The line configuration may, for example, have been created beforehand by means of the programming device. The line configuration can be centrally stored in the safety-directed control system, for example in a control unit connected to the fieldbus, for instance in a standard control unit connected to the fieldbus, or in the programming device connected to the fieldbus. For example, the line configuration can be stored in a control program of the control unit, for example, in a standard control program of the control unit.

If a deviation of the associations stored in the individual safety sensor units from the line configuration is determined during the comparison, a reconfiguring of the associations, which are stored in the individual safety sensor units, of the individual sensor connections with the safety lines can take place. The comparison and/or the reconfiguring can, for example, take place by the control unit, for example the standard control unit, or by a master unit controlling the communication on the fieldbus. On the reconfiguring, the associations stored in the individual safety sensor units can be changed to the association, which is centrally stored in the line configuration, of the sensor connections of the individual safety sensor units with the safety lines.

The safety configuration stored in the at least one safety actuator unit can also comprise associating the individual safety sensor units and/or their sensor connections with the individual safety lines. The safety actuator unit can be configured to monitor the communication link to the individual safety sensor units, which can trigger a safety response in the safety actuator unit, via the fieldbus, for example by receiving information sent periodically by the safety sensor units and expected by the safety actuator unit. Furthermore, the safety actuator unit can be configured, on a disturbance of the communication link to one of the safety sensor units, to execute those safety responses that are stored for the safety lines that can be triggered by the respective safety sensor unit.

In accordance with an alternative embodiment, the programming device is configured to automatically recognize the individual safety sensor units on the connection to the fieldbus and to automatically associate one safety line each with each recognized safety sensor unit. In this case, the individual safety sensor units can also be designed without a stored association of the sensor connections with individual safety lines. An association of the sensor connections with the safety lines in the programming device makes it possible to associate the safety lines in a particularly flexible manner with the individual sensor connections and, for example, to execute the association in dependence on the individual safety sensor units or safety sensors connected to the fieldbus.

In accordance with an embodiment, the at least one safety sensor unit has a plurality of safe sensor connections for connecting safety sensors, wherein a separate safety line is associated with each sensor connection, and wherein the safety sensor unit is configured to transmit a respective separate line activation signal via the fieldbus on the actuation of the individual safety sensors. This reduces the complexity and the costs of the safety-directed control system since a single safety sensor unit can be used to connect a plurality of safety sensors.

In accordance with an embodiment, the safety-directed control system comprises a further safety actuator unit connected to the fieldbus. The programming device is in this respect configured to display safety responses, which are executable by the further safety actuator unit, via the output interface and to receive an additional user input via the input interface, with the additional user input associating a selected further safety response, which is executable by the further safety actuator unit, with the selected safety line.

Since the programming device is configured to receive user inputs that associate different safety responses of the safety actuator unit with the safety line, on the one hand, and with the further safety actuator unit, on the other hand, the safety-directed control system can be configured in a particularly flexible manner. For example, the safety actuator unit and the further safety actuator unit can be arranged at different protected regions of the safeguarded system, for example at a material feed apparatus and at a product discharge apparatus, with different hazards occurring in the different protected regions. In this case, safety responses that are each adapted to the hazards can then be defined for the individual protected regions, for example a safe stop for the material feed apparatus that is directly at risk and an operation at a safely reduced speed for the product discharge apparatus that is only indirectly at risk.

The configuring of the further safety actuator unit can, for example, he carried out on the first-time connection of the further safety actuator unit to the fieldbus, for instance on a subsequent extension of the control system already comprising the safety actuator unit. In this way, the control system can be easily and flexibly extended by further safety actuator units.

In accordance with an embodiment, the safety actuator unit is configured to execute a safety response stored for a first safety line at a higher activation priority than a safety response stored for a second safety line. Thus, on a simultaneous activation of the first and second safety lines, the safety response having the higher activation priority, i.e. the safety response stored for the first safety line, is executed and conflicts are safely resolved. The individual activation priorities can, for example, be dependent on a residual hazard that also still remains on the execution of the safety response. Thus, a safety response having a lower residual hazard, for instance a safe stop, can be executed at a higher activation priority than a safety response having a higher residual hazard, for instance an operation at a safely limited speed.

Alternatively or additionally, the control system can be configured to transmit, via the fieldbus, a first line activation signal of the first safety line at a higher transmission priority than a second line activation signal of the second safety line. The safety in the control system can thereby be increased further. The priorities associated with the individual line activation signals can, for example, be derived from the activation priorities of the safety responses that are associated with the individual safety lines. If a safety response having a higher activation priority, for example a safe stop, is associated with the first safety line and a safety response having a lower activation priority, for example an operation at a safely limited speed, is associated with the second safety line, the line activation signal of the first safety line can thus be transmitted at a higher transmission priority than the line activation signal of the second safety line.

In accordance with an embodiment, the programming device is configured to receive a link user input via the user interface, wherein the link user input associates the selected safety response, which is executable by the safety actuator unit, with a logical link of the selected safety line to a further selected safety line. The programming device is configured to store the logical link and the selected safety response as a safety configuration in the safety actuator unit and the safety actuator unit is configured to independently evaluate the logical link on the reception of the line activation signal of the selected safety line and/or of the selected further safety line.

Complex safety responses can also be implemented by a logical link of a plurality of safety lines. For example, the logical link can be an AND link, an OR link or the like. In the case of an AND link, the selected safety response is only executed on the activation of both safety lines, for example on a simultaneous opening of a safety door and interruption of a light barrier, whereas no safety response or another safety response is executed on the activation of only one safety line.

In accordance with an embodiment, the control system comprises a non-safe standard control unit connected to the fieldbus, wherein the standard control unit is configured to receive and process the activation signals of the safety lines as input data, and wherein all the safety responses selected for the safety actuator unit are stored in the standard control unit. The standard control unit is further configured to control the safety actuator unit on the reception of a line activation signal of an activated safety line in accordance with the safety response selected for the activated safety line and the safety actuator unit is configured to independently safely monitor the control by the standard control unit as part of the independent execution of the safety response.

Since the safety actuator unit is controlled by the standard control unit after the activation of the safety line, the resources of the standard control unit, for example its logic units, can be used to execute the safety response and the safety actuator unit can be formed in a comparatively simple manner. To monitor the non-failsafe control of the safety actuator unit by the standard control unit, the safety actuator unit can have the safety module designed separately from the standard module.

In accordance with an embodiment, the control system has a master unit, wherein the master unit is configured to control a bus access to the fieldbus in accordance with the master-slave method. The safety actuator units and/or the safety sensor units are connected to the fieldbus as slave units and the control system is configured to transmit the line activation signals from the safety sensor units to the safety actuator units via the fieldbus in direct cross traffic without a safety-directed intermediate processing by the master unit.

A deterministic bus access and thus, for example, a real-time data transmission via the fieldbus can be ensured by means of the master unit. Since the line activation signals are transmitted without an intermediate processing by the master unit, a particularly fast triggering of the safety responses linked to the activated safety line is made possible. The direct cross traffic can, for example, be implemented in that the safety actuator units or the safety modules of the safety actuator units read the line activation signals directly from fieldbus telegrams filled by the safety sensor units. Alternatively, the direct cross traffic can also comprise a recopying of the line activation signals from fieldbus telegrams filled by the safety actuator units into separate fieldbus telegrams read by the safety actuator units, wherein the recopying takes place by the master unit without further reading or evaluation of the line activation signals.

The direct cross traffic can also be implemented by means of a publisher/subscriber communication in which the safety sensor units transmit the line activation signals via the fieldbus by providing them for invoking by the safety actuator units or by their safety modules and in which the safety actuator units or the safety modules receive the line activation signals directly via the fieldbus by invoking the line activation signals independently of the safety sensor units. The provision of the line activation signals by the safety sensor units and/or the invoking of the line activation signals by the safety actuator units can, for example, take place cyclically and/or at deterministic time intervals. Alternatively, the provision of the line activation signals by the safety sensor units can also take place in an event-driven manner, wherein an event triggering the provision can, for example, be a change in state of a sensor signal received via an associated sensor connection. For example, a publisher/subscriber communication via UPC UA over TSN can be used for cross traffic.

A method of operating a safety-directed control system comprising at least one safety sensor unit and at least one safety actuator unit, which are connected to one another via a fieldbus, and a programming device, comprises the following steps:
  associating sensor connections, which are provided by the at least one safety sensor unit, for connecting safety sensors to the fieldbus with safety lines;
  displaying the available safety lines via an output interface of the programming device;
  receiving a user input via an input interface of the programming device, wherein the user input associates a selected safety response, which is executable by the safety actuator unit, with at least one selected safety line;
  storing the association between the selected safety line and the selected safety response in the safety actuator unit as a safety configuration by means of the programming device;
  independently activating a safety line, which is associated with a sensor connection of the safety sensor unit, by transmitting a line activation signal via the fieldbus by the safety sensor unit;
  directly receiving the line activation signal from the safety sensor unit by the safety actuator unit via the fieldbus; and
  independently executing the safety response, which is stored for the activated safety line in the safety configuration, by the safety actuator unit on the reception of the line activation signal.

The method can in particular be used to operate the safety-directed control system in accordance with the claim. In this respect, all the technical effects and embodiments that have been described in connection with the safety-directed control system in accordance with the claim also relate to the method in accordance with the claim and vice versa.

The invention will be explained in the following with reference to Figures. In this respect, there are shown in a schematic representation in each case.

Figure 1:
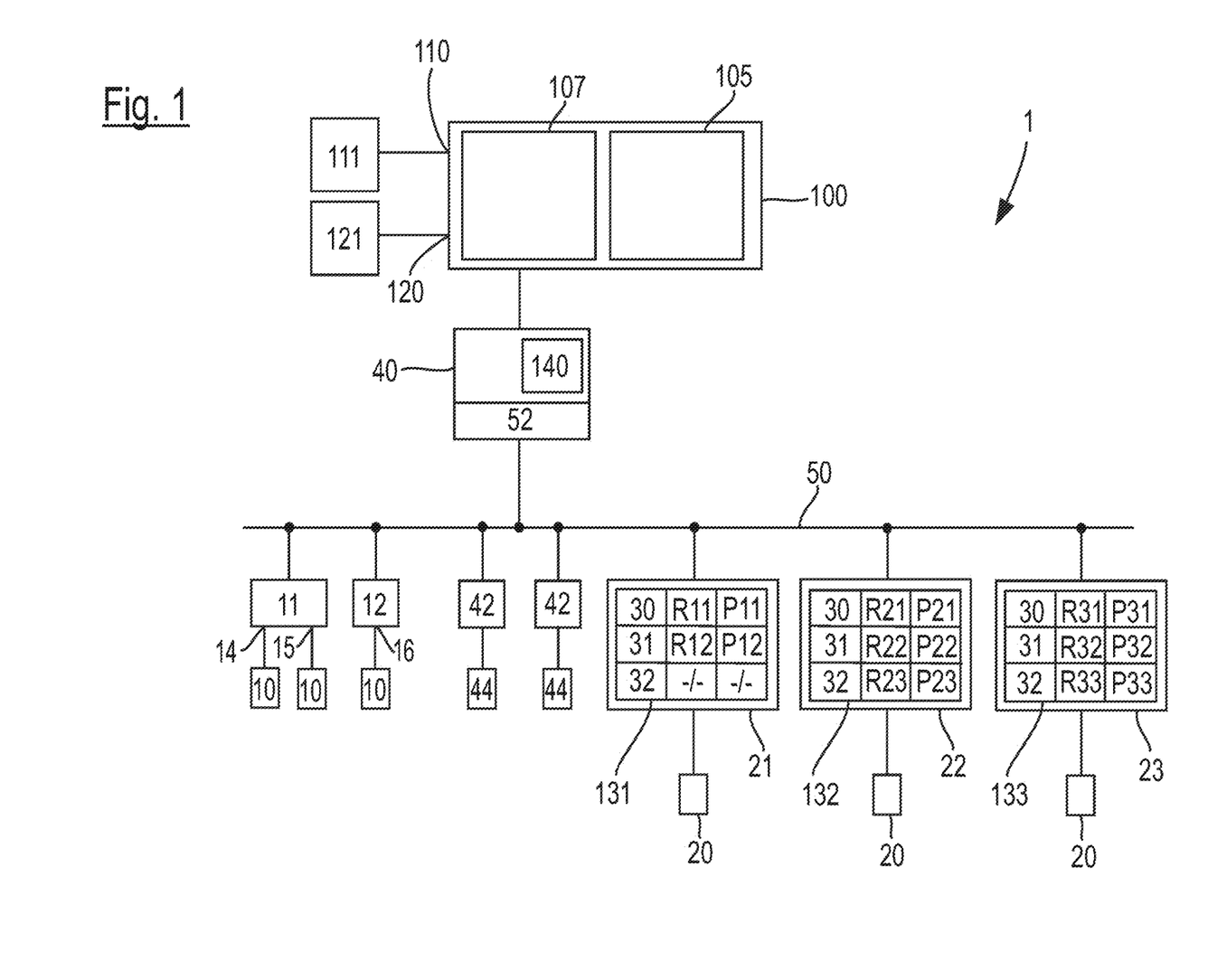
FIG. 1 a safety-directed control system.

FIG. 1 shows a safety-directed control system 1 comprising a first safety sensor unit 11; a second safety sensor unit 12; a first safety actuator unit 21; a second safety actuator unit 22; and a third safety actuator unit 23. The safety sensor units 11, 12 and the safety actuator units 21, 22, 23 are connected to one another via a fieldbus 50. The first safety sensor unit 11 comprises a first safe sensor connection 14 and a second safe sensor connection 15 to each of which a safety sensor 10 is connected. The second safety sensor unit 12 comprises a single third safe sensor connection 16 having a further safety sensor 10 connected thereto. A respective safety actuator 20 is connected to the fieldbus 50 via the safety actuator units 21, 22, 23, wherein the safety actuators 20 are each configured as drives.

The safety sensors 10 connected to the first safety sensor unit 11 serve to safeguard a first protected region and the safety sensor 10 connected to the second safety sensor unit 12 serves to safeguard a second protected region. Within the first protected region, machine parts perform a hazardous movement that is driven by the safety actuator 20 connected to the first safety actuator unit 21. Within the second protected region, machine parts perform a hazardous movement that is driven by the safety actuators 20 that are connected to the second and third safety actuator units 22, 23.

The first safety sensor unit 11 is configured to transmit a first line activation signal for activating a first safety line 30 via the fieldbus 50 when the safety sensor 10 connected to the first sensor connection 14 is activated, and a second line activation signal for activating a second safety line 31 when the safety sensor 10 connected to the second sensor connection 15 is activated. Analogously, the second safety sensor unit 12 is configured to transmit a third line activation signal for activating a third safety line 33 when the safety sensor 10 connected to the third sensor connection 16 is activated.

The safety sensor 10 connected to the first sensor connection 14 of the first safety sensor unit 11 is configured as a rotary encoder that transmits sensor data, which represent a rotational speed of a machine part arranged in the first protected region, to the first safety sensor unit 11 via the first sensor connection 14. The first safety sensor unit 11 performs a failsafe preprocessing of the sensor data of the rotary encoder and checks the sensor data for an exceeding of a permitted value range. On an exceeding of the permitted value range, the first safety sensor unit 11 activates the first safety line with which the first sensor connection 14 is associated.

The safety sensors 10 connected to the second and third sensor connections 15, 16 are each configured as switches that each transmit a binary sensor signal to the safety sensor units 11, 12 via the second or third sensor connection 15, 16. The second and third safety sensor units 11, 12 respectively transmit the second and third line activation signals respectively via the fieldbus 50 as soon as the binary sensor signal received via the associated sensor connection 15, 16 signals an actuation of the corresponding switch.

A first safety configuration 131 is stored in the first safety actuator unit 21, a second safety configuration 132 is stored in the second safety actuator unit 22, and a third safety configuration 133 is stored in the third safety actuator unit 23. The first safety configuration 131 associates selected first safety responses R11, R12, which have first configuration parameters P11, P12 and which are each executable by the first safety actuator unit 21, with the first and second safety lines 30, 31 and does not associate a safety response of the first safety actuator unit 21 with the third safety line 32. The second and third safety configurations 132, 133 associate selected second safety responses R21, R22, R23, which have second configuration parameters P21, P22, P23 and which are executable by the second safety actuator unit 22, and selected third safety responses R31, R32, R33, which have third configuration parameters P31, P32, P33 and which are executable by the third safety actuator unit 23, with the individual safety lines 30, 31, 32.

A non-safe standard control unit 40 and two non-safe standard sensor units 42 are further connected to the fieldbus 50. In this respect, the standard control unit 40 is connected to the fieldbus 50 via a master unit 52. The non-safe standard sensor units 42 serve to connect non-safe standard sensors 44 and create non-safety critical input data on the basis of sensor data of the connected standard sensors 44, said non-safety critical input data then being transmitted to the standard control unit 40 via the fieldbus 50 for further processing. The standard control unit 40 processes the input data in accordance with a standard control program 140 stored in the standard control unit 40 and generates non-safety directed output data on the basis of the input data. The standard control unit 40 controls non-safe standard actuator units, not shown in FIG. 1, by means of the non-safety directed output data.

The control system 1 further comprises a programming device 100 that is connected to the fieldbus 50 via the standard control unit 40 and the master unit 52 and that is connected to the safety actuator units 21, 22, 23. The programming device 100 comprises a safety programming module 105 for creating the safety configurations 131, 132, 133; and a standard programming module 107 for creating the standard control program 140. The programming device 100 further comprises an output interface 110 having a display device 111 connected thereto; and an input interface 120 having an input device 121 connected thereto.

Figure 2:
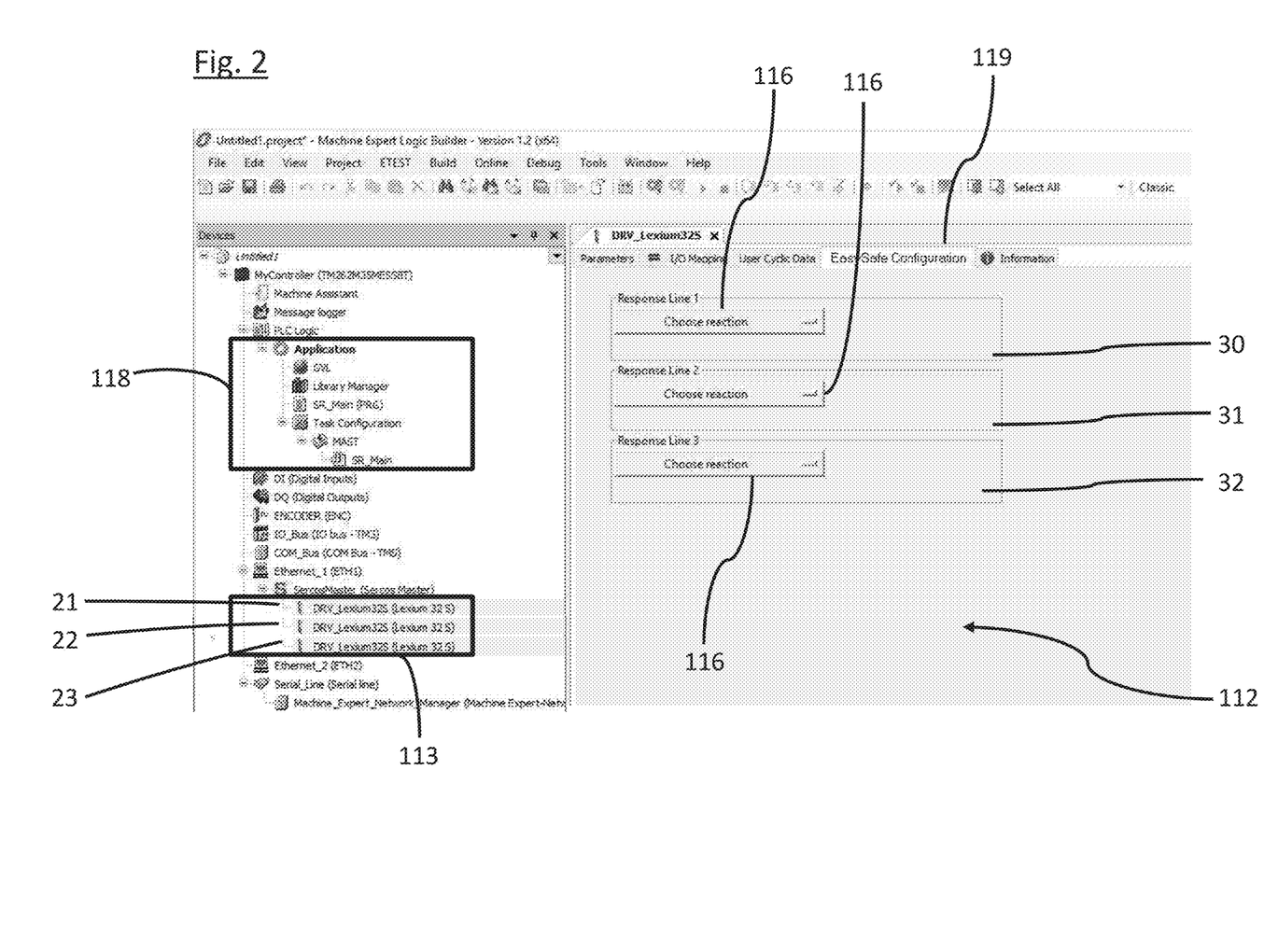
FIG. 2 a first user output of a programming device of the control system.

FIG. 2 shows a first user output of the programming device 100 that is displayed on the display device 111 via the output interface 110. The illustrated user output comprises a menu tree having a standard programming query 118 via which the programming of the standard control program 140 is selectable by means of the standard programming module 107; and a safety actuator query 113 in which the individual safety actuator units 21, 22, 23 are listed and are selectable for a further configuring by means of a user input.

In the representation shown in FIG. 2, the first safety actuator unit 21 is selected and the safety programming module 105 of the programming device 100 represents, in a safety output region 112, a safety programming query 119 which is selectable by means of a tab 101 and via which the first safety configuration 131 can he created by means of the safety programming module 105. Analogously, on the selection of the second or third safety actuator unit 22, 23 in the safety actuator query 113, the safety programming module 105 of the programming device 100 represents safety programming queries, which are each selectable by means of the tab 101, for the second or third safety actuator unit 22, 23 via Which the second and third safety configurations 132, 133 can be created by means of the safety programming module 105. A non-safe configuring of non-safe standard parameters of the selected safety actuator unit 21 can be performed via the further tabs shown in FIG. 2.

With the safety programming query 119 in the safety output region 112, the safety programming module 105 of the programming device 100 represents the available safety lines 30, 31, 32, which each have a safety response query 116, in order to enable an association of a respective one safety response, which is executable by the first safety actuator unit 21, with the individual safety lines 30, 31, 32 by means of a user input. The safety response queries 116 are each represented as selection menus that are selectable by means of a user input.

Figure 3:
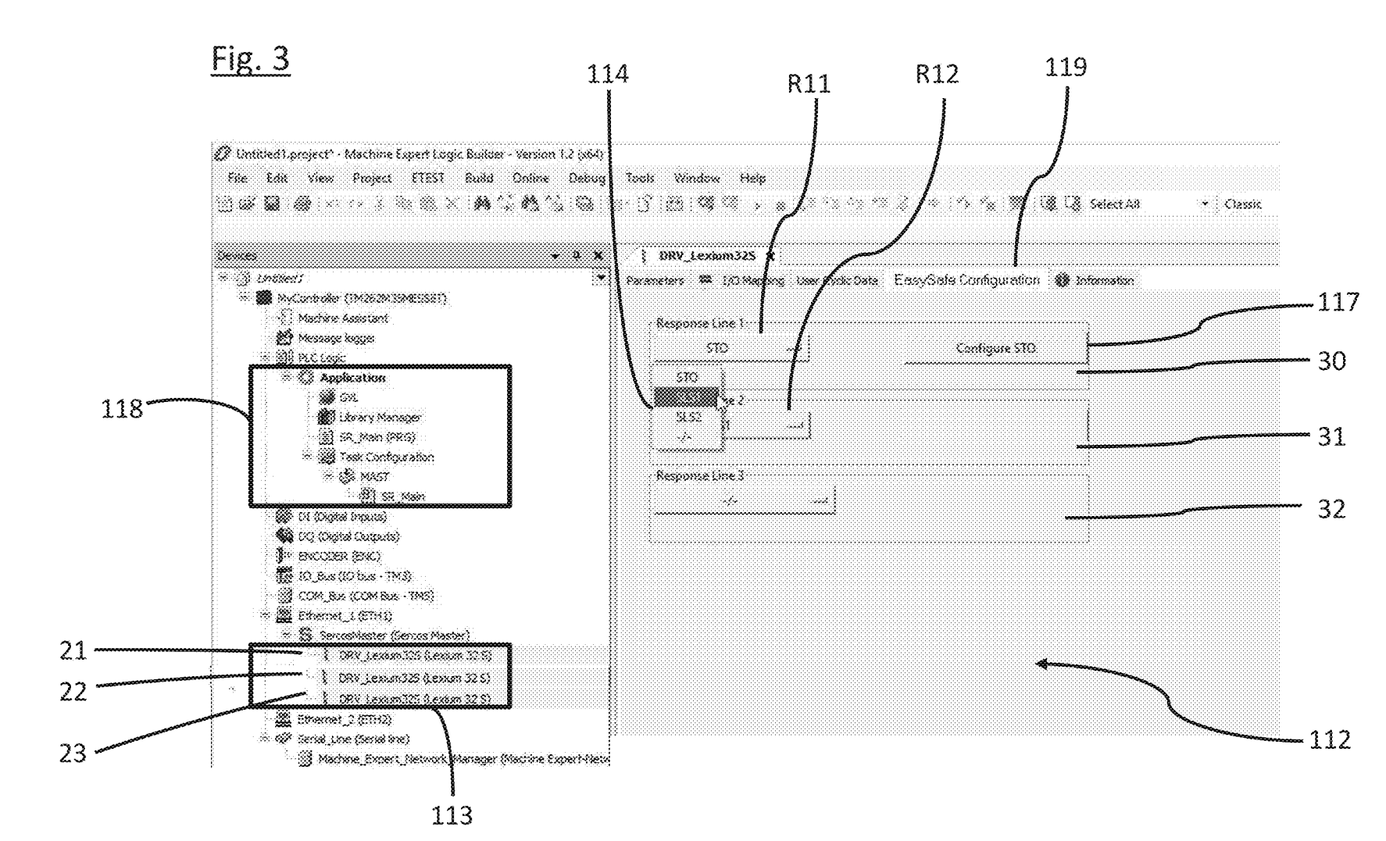
FIG. 3 a second user output of the programming device.

FIG. 3 shows a second user output that is represented on the display device 111 of the programming device 100 via the output interface 110 after the safety programming module 105 of the programming device 100 has received respective user inputs that associate, as a selection of the first safety line 30, a first safety response R11 of the first safety actuator unit 21, namely a safe torque off (STO) of the connected drive 10, and, as a further selection of the third safety line 32, no safety response with the first safety actuator unit 21. At the same time, the safety programming module 105 of the programming device 100 displays the safety responses 114, which can be executed by the first safety actuator unit 21 and which can be associated with the second safety line 31, in a selection list in the second user output.

Figure 4:
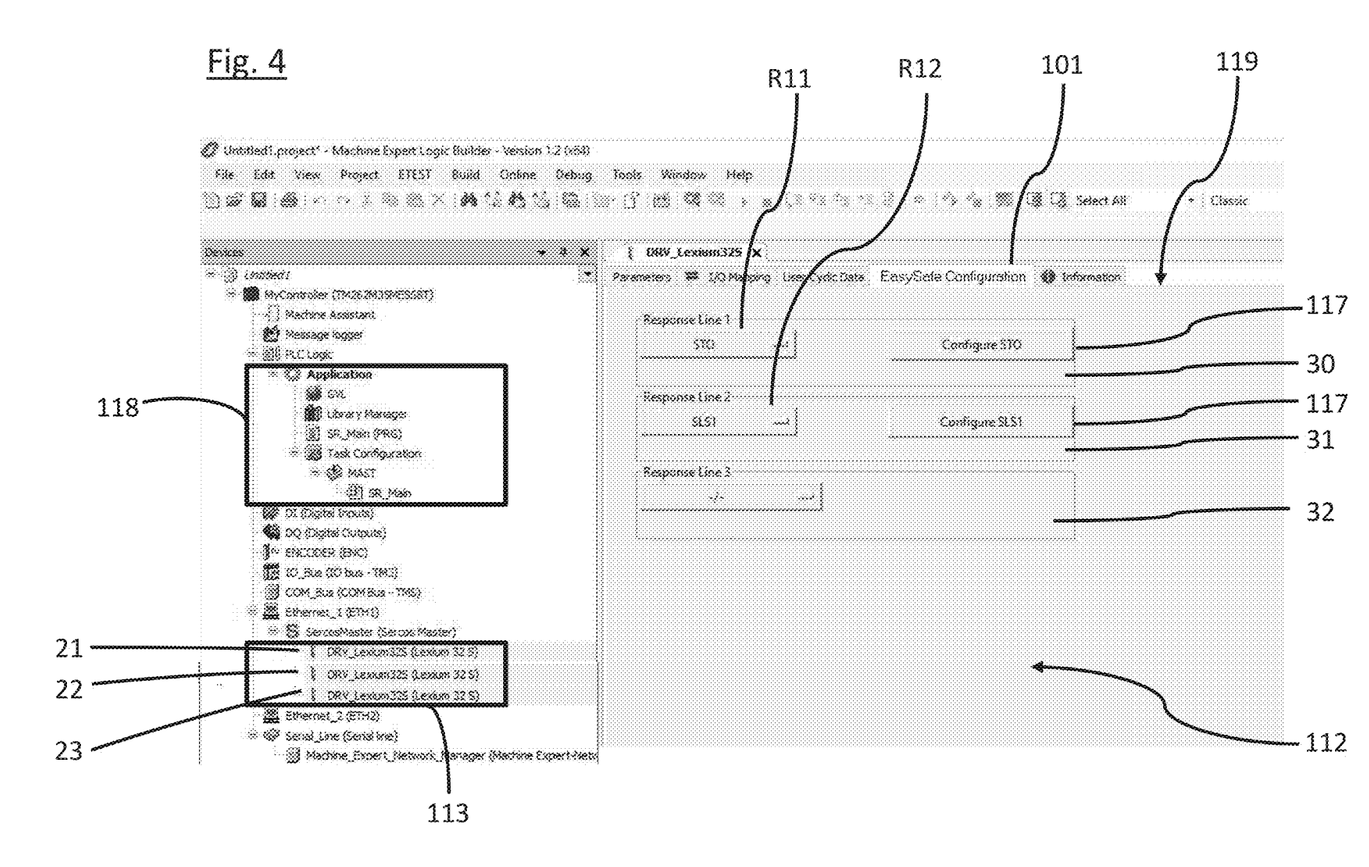
FIG. 4 a third user output of the programming device.

FIG. 4 shows a third user output, which is represented on the display device 111 of the programming device 100 via the output interface 110, after the safety programming module 105 of the programming device 100 has received a user input that associates a second safety response R12 of the first safety actuator unit 21, namely a safely limited speed (SLS) of the connected drive 10, with the second safety line 31. In this respect, the safety programming module 105 represents respective parameter queries 117 for inputting configuration parameters of the safety responses R11, R12, which are configured as selection menus, for the two selected safety responses R11, R12.

Figure 5:
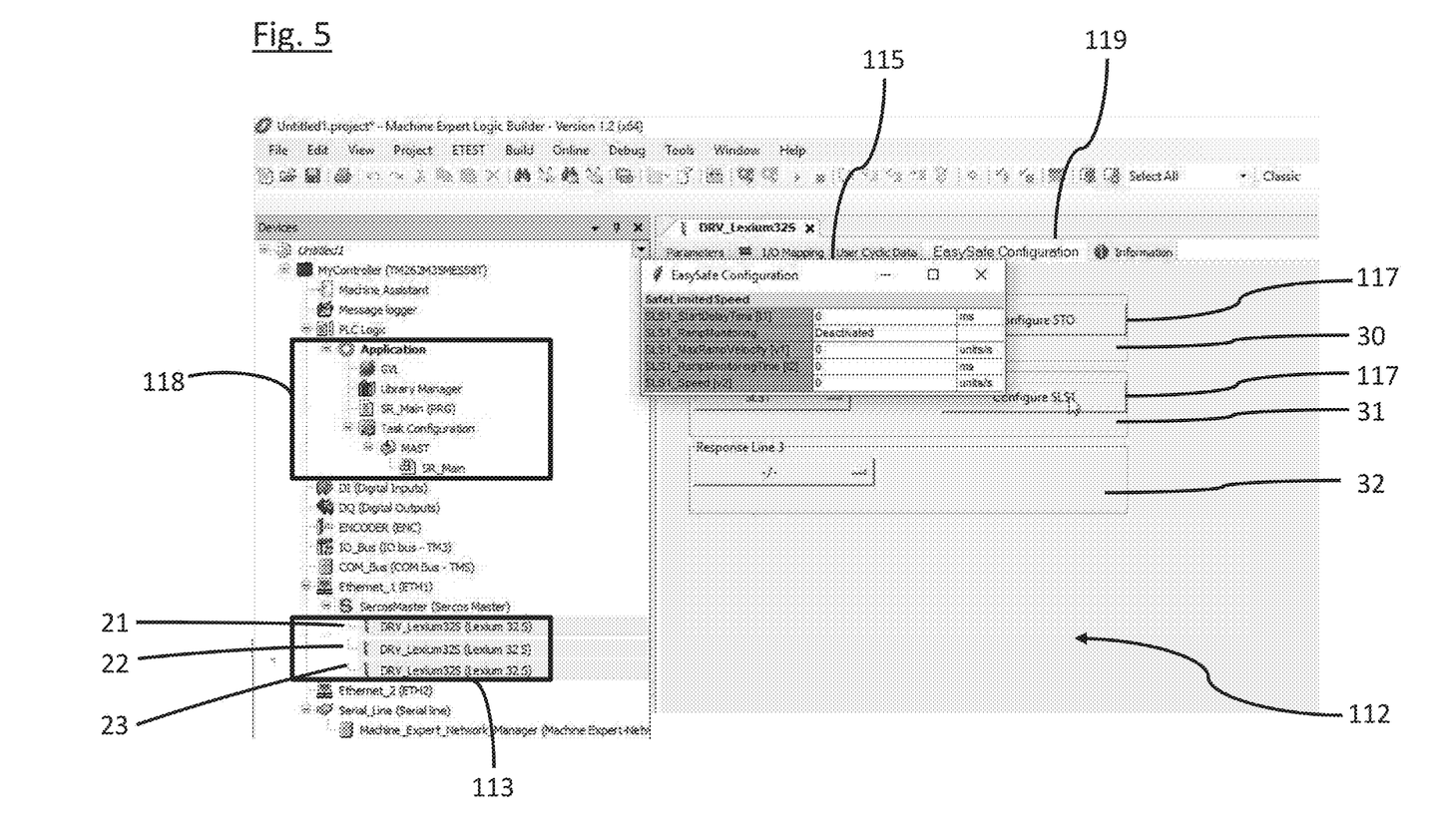
FIG. 5 a fourth user output of the programming device.

FIG. 5 shows a third user output of the programming device 100 for parameterizing the second safety response R12, said third user output being represented on the display device 111 via the output interface 110. In the selection menu represented via the parameter query 117, individual configuration parameters 115 of the second safety response R12 are shown that can be changed by means of a user input.

Figure 6:
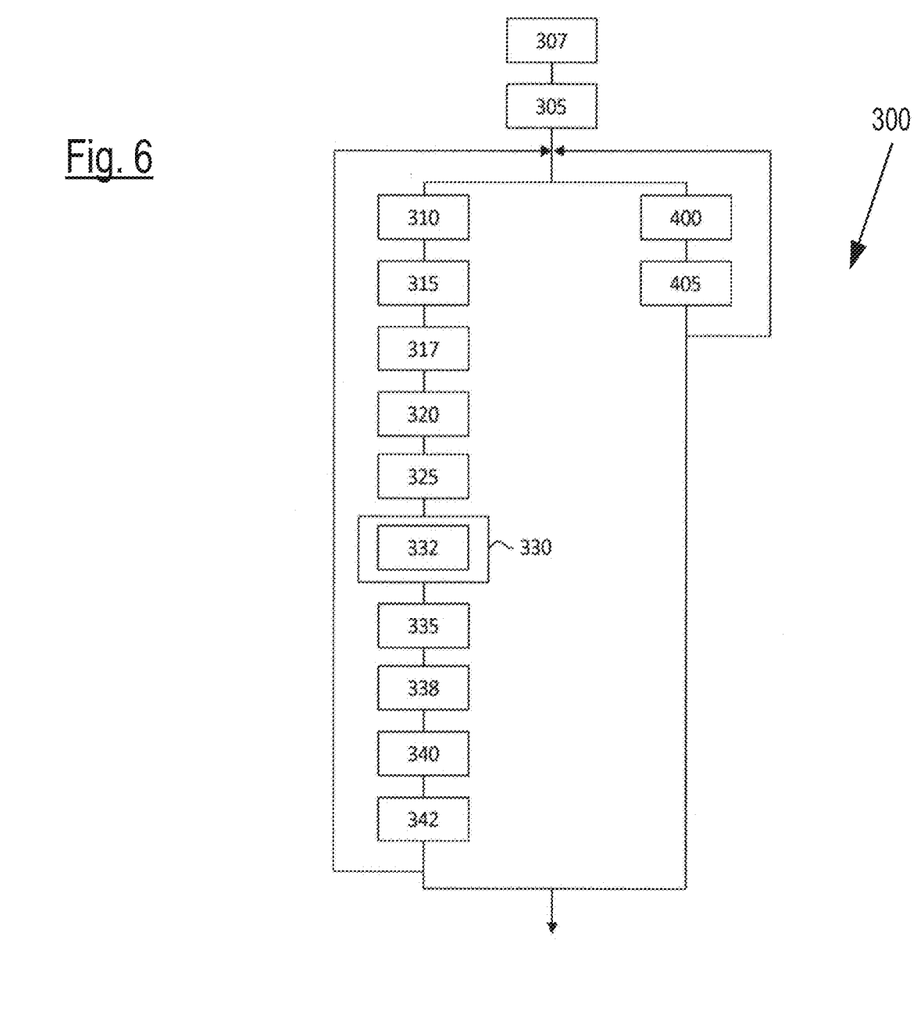
FIG. 6 a first part of a method of operating the safety-directed control system.

FIG. 6 shows a first part of a method 300 of operating the safety-directed control system 1 in which the standard control program 140 is programmed and the safety configurations 131, 132, 133 of the safety actuator units 21, 22, 23 are created.

The method 300 first comprises associating 307 the sensor connections 14, 15, 16 provided by the safety sensor units 11, 12 with the safety lines 30, 31, 32 within the safety sensor units 11, 12. Subsequently, the method 300 comprises recognizing 305 the safety sensor units 11, 12 and the stored safety lines 30, 31, 32 via the fieldbus 50 by the programming device 100. Either a selection 310 of the configuring of the safety actuator units 21, 22, 23 or a selection 400 of the programming of the standard control program 140 then takes place by means of a user input. A reception 405 of user inputs for programming the standard control program 140 takes place on the selection 400 of the programming of the standard control program 140. Subsequently, the selection 310 for configuring the safety actuator units 21, 22, 23 or the selection 400 for programing the standard control program 140 can take place again.

After the selection 310 for configuring the safety actuator units 21, 22, 23, a reception 315 of a user input for selecting the safety actuator unit 21, 22, 23 to be configured and an invoking 317 of safety responses 114, which can be performed by the selected safety actuator unit 21, 22, 23 and which are stored in the selected safety actuator unit 21, 22, 23, take place. The method 300 subsequently comprises displaying 320 the available safety lines 30, 31, 32 and displaying 325 the executable safety responses 114 in the safety output region 112. A reception 330 of a user input for associating an executable safety response 114 with one of the available safety lines 30, 31, 32 then takes place. In this respect, a link user input can optionally also be received (332) that logically links two available safety lines 30, 31, 32 into an additional safety line, for example, by means of an AND link or an OR link.

The method 300 further comprises receiving 335 a further user input for associating the configuration parameters 115 with the selected safety responses 114. Subsequently, a checking 338 for a complete configuration of the selected safety actuator unit 21, 22, 23 takes place, wherein it is inter alia checked whether a selection has been made by means of a user input for each available safety line 30, 31, 32 as well as whether and, if so, which safety response 114 is associated with the individual safety lines 30, 31, 32. Finally, a storage 340 of the selected safety responses 114 as a safety configuration 131, 132, 133 in the selected safety actuator unit 21, 22, 23 as well as a storage 342 of the selected safety responses 114 in the standard control unit 40 take place.

Figure 7:
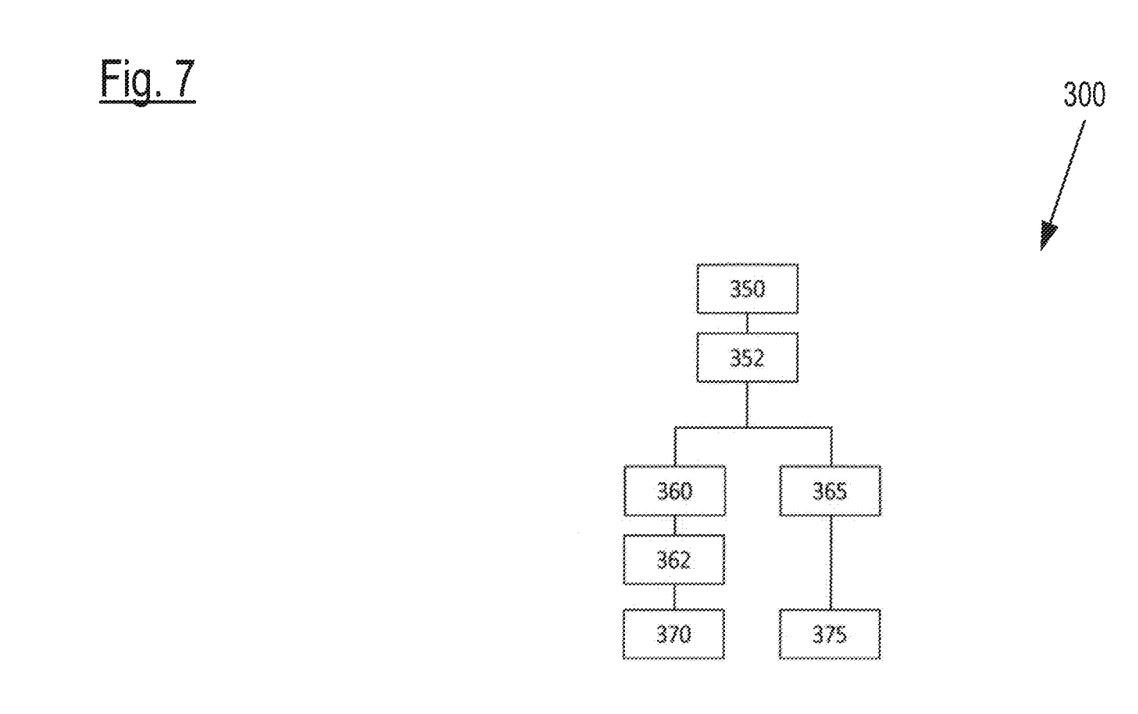
FIG. 7 a second part of the method of operating the safety-directed control system.

FIG. 7 shows a second part of the method 300 in which a safety line 30, 31, 32 is activated (350) in a normal operation of the safety-directed control system 1. Subsequently, a line activation signal associated with the activated safety line 30, 31, 32 is transmitted (352) via the fieldbus 50 in that it is provided by the respective safety sensor unit 11, 12 for invoking via the fieldbus 50 and is received (360) by the safety actuator units 21, 22, 23 in the direct cross traffic via the fieldbus 50 in that it is invoked by the safety actuator units 21, 22, 23 by the providing safety sensor unit 11, 12.

An optional evaluation 362 of a logical link of a plurality of safety lines 30, 31, 32 and an independent execution 370 of the safety response 114 associated with the activated safety line 30, 31, 32 subsequently take place in the individual safety actuator units 21, 22, 23. A reception 365 of the line activation signal takes place in parallel in the standard control unit 40, whereupon the standard control unit 40 controls (375) the safety actuator units 21, 22, 23 in accordance with the respective stored safety responses 114 and the control 375 is monitored in a failsafe manner by the standard control unit 40 as part of the execution 370 of the safety response 114 in the safety actuator unit 21, 22, 23.

REFERENCE NUMERAL LIST 1 safety-directed control system
10 safety sensors
11 first safety sensor unit
12 second safety sensor unit
14 first sensor connection
15 second sensor connection
16 third sensor connection
20 safety actuators
21 first safety actuator unit
22 second safety actuator unit
23 third safety actuator unit
30 first safety line
31 second safety line
32 third safety line
40 standard control unit
42 standard sensor unit
44 standard sensor
50 fieldbus
52 master unit
100 programming device
101 tab
105 safety programming module
107 standard programming module
110 output interface
111 display device
112 safety output region
113 safety actuator query
114 safety response
115 configuration parameter
116 safety response query
117 parameter query
118 standard programming query
119 safety programming query
120 input interface
121 input device
131 first safety configuration
132 second safety configuration
133 third safety configuration
140 standard control program
300 method
305 recognizing safety sensor units
307 associating safety lines
310 selecting a configuration of safety actuator units
315 receiving a user input for selecting a safety actuator unit
317 invoking executable safety responses
320 displaying available safety lines
325 displaying executable safety responses
330 receiving a user input for associating a safety line
332 receiving a link user input
335 receiving a further user input for associating a configuration parameter
338 checking for a complete configuration
340 storing the selected safety response in a safety actuator unit
342 storing the selected safety response in a standard control unit
350 activating a safety line
352 transmitting a line activation signal
360 receiving the line activation signal
362 evaluating a logical link
365 receiving a line activation signal in a standard control unit
370 executing a safety response
375 controlling in accordance with a selected safety response
400 selecting programming of the standard control program
405 receiving user inputs to configure a standard control program

The invention claimed is:

1. A safety-directed control system comprising:
at least one safety sensor unit;
at least one safety actuator unit, which is connected to the one safety sensor unit via a fieldbus;
a programming device connected to the at least one safety actuator unit via the fieldbus; and
processing circuitry;

wherein sensor connections for connecting safety sensors to the fieldbus are provided by the at least one safety sensor unit, and the sensor connections are associated with safety lines, wherein the processing circuitry is configured to display available safety lines of the safely lines to a user via an output interface, wherein the processing circuitry is configured to receive a user input of the user via an input interface, with the user input associating a selected safety response from safety responses, which is executable by the safety actuator unit, with at least one selected safety line of the available safety lines, wherein the processing circuitry is configured to store the association between the at least one of the safety lines and the selected safety response in the safety actuator unit as a safety configuration, wherein the safety lines associated with individual sensor connections of the sensor connections are configured to be independently activated by the at least one safety sensor unit by transmitting line activation signals of individual safety lines of the safety lines via the fieldbus, wherein the safety actuator unit is configured to receive the line activation signals via the fieldbus directly from the at least one safety sensor unit, on reception of a line activation signal of the line activation signals of an activated safety line of the safety lines, to independently execute the selected safety response stored for the activated safety line in the safety configuration, and wherein the safety responses executable by the safety actuator unit are stored in the safety actuator unit and are configured to be retrieved by the programming device via the fieldbus for selection by the user.

2. The safety-directed control system in accordance with claim 1,
wherein the safety responses of the safety actuator unit selectable by means of the user input are stored as parameterizable program modules.

3. The safety-directed control system in accordance with claim 1,
wherein the processing circuitry is configured to display, after the selection of the selected safety response, configuration parameters of the selected safety response, which is configured to be changed by the user, to the user via the output interface, wherein the processing circuitry is configured to receive a further user input via the input interface, and
wherein the further user input assigns at least one of the displayed configuration parameters to the selected safety response.

4. The safety-directed control system in accordance with claim 1,
wherein the processing circuitry is configured to receive, via the input interface, the further user input for selecting the safety actuator unit connected to the fieldbus,
wherein the processing circuitry is configured to display the available safety lines and the safety responses executable by the selected safety actuator unit to the user via the output interface.

5. The safety-directed control system in accordance with claim 1,
wherein the processing circuitry is configured to receive, via the input interface, further user inputs for programming a non-safe standard control program of a non-safe standard control unit connected to the fieldbus, and wherein the processing circuitry is configured to execute the programming of the non-safe standard control program and to execute a safety configuring for creating the safety configuration by means of separate programming modules and/or to display them in separate output regions via the output interface.

6. The safety-directed control system in accordance with claim 1,
wherein the processing circuitry is configured to only store the selected safety response in the safety actuator unit when the processing circuitry has received the user input having a user-defined selection for each safety line of the safety lines.

7. The safety-directed control system in accordance with claim 1,
wherein an association of one of the sensor connections or a plurality of the sensor connections of the at least one safety sensor unit with the safety lines is stored in the at least one safety sensor unit.

8. The safety-directed control system in accordance with claim 1,
wherein the sensor connections for connecting the safety sensors to the fieldbus are provided by the at least one safety sensor unit such that a separate safety line of the safety lines is associated with each sensor connection of the sensor connections, and wherein the at least one safety sensor unit is configured to transmit a respective separate line activation signal of the line activation signals via the fieldbus on actuation of the individual safety sensors.

9. The safety-directed control system in accordance with claim 1,
further comprising a further safety actuator unit connected to the fieldbus,
wherein the processing circuitry is configured to display further safety responses, which are executable by the further safety actuator unit, via the output interface,
wherein the processing circuitry is configured to receive an additional user input via the input interface, with the additional user input associating one of the further safety responses, which is executable by the further safety actuator unit, with the selected safety line, and
wherein the further safety response differs from the selected safety response for the safety actuator unit.

10. The safety-directed control system in accordance with claim 1,
wherein the safety actuator unit is configured to execute a safety response of the safety responses stored for a first safety line of the safety lines at a higher activation priority than a safety response of the safety responses stored for a second safety line of the safety lines.

11. The safety-directed control system in accordance with claim 1,
wherein the processing circuitry is configured to receive a link user input via the user interface,
wherein the link user input associates the selected safety response, which is executable by the safety actuator unit, with a logical link of the selected safety line to a further selected safety line of the available safety lines,
wherein the processing circuitry is configured to store the logical link and the selected safety response as the safety configuration in the safety actuator unit, and
wherein the safety actuator unit is configured to independently evaluate the logical link on the reception of a line activation signal of the lines activation signals of the selected safety line of the safety lines and/or of the further selected safety line.

12. The safety-directed control system in accordance with claim 1,
wherein the safety-directed control system comprises a non-safe standard control unit connected to the fieldbus,
wherein the non-safe standard control unit is configured to receive and process the activation signals of the safety lines as input data,
wherein all the selected safety responses for the safety actuator unit are stored in the non-safe standard control unit,
wherein the non-safe standard control unit is configured to control the safety actuator unit on the reception of the line activation signal of the activated safety line in accordance with the selected safety response stored for the activated safety line, and
wherein the safety actuator unit is configured to independently safely monitor control by the non-safe standard control unit as part of the independent execution of the selected safety response.

13. The safety-directed control system in accordance with claim 1,
wherein the safety-directed control system has a master unit,
wherein the master unit is configured to control a bus access to the fieldbus in accordance with master-slave method,
wherein the safety actuator unit and/or the at least one safety sensor unit is/are connected to the fieldbus as slave unit(s), and
wherein the safety-directed control system is configured to transmit the line activation signals from the at least one safety sensor unit to the safety actuator unit via the fieldbus in direct cross traffic without a safety-directed intermediate processing by the master unit.

14. The safety-directed control system in accordance with claim 1, the safety responses are configured to be stored in each of the safety actuator units.

15. The safety-directed control system in accordance with claim 14, the safety responses associated with said each of the safety actuator units are different from one another.

16. The safety-directed control system in accordance with claim 1, wherein
the at least one of the safety lines include a first safety line, a second safety line, and a third safety line,
the safety actuator unit is a first safety actuator unit, and
the safety configuration is a first safety configuration.

17. The safety-directed control system in accordance with claim 16, wherein the first safety configuration associates the safety responses configured to be executed by the first safety actuator unit with the first safety line and the second safety line.

18. The safety-directed control system in accordance with claim 16, wherein the first safety configuration does not associate a safety response of the first safety actuator unit with the third safety line.

19. A method of operating a safety-directed control system comprising at least one safety sensor unit and at least one safety actuator unit, which are connected to one another via a fieldbus, and processing circuitry, the method comprising:
associating sensor connections, which are provided by the at least one safety sensor unit, for connecting safety sensors to the fieldbus with safety lines;
displaying available safety lines of the safety lines via an output interface of the processing circuitry;
retrieving, by a programming device via the fieldbus, safety responses from the safety actuator unit for selection by a user, wherein the programming device is connected to the safety actuator unit via field bus and the safety responses are executable by the safety actuator unit and stored in the safety actuator unit;
receiving a user input from the user via an input interface of the processing circuitry, wherein the user input associates a selected safety response of the safety responses, which is executable by the safety actuator unit, with at least one of the safety lines;
storing the association between the at least one of the safety lines and the selected safety response in the safety actuator unit as a safety configuration by means of the processing circuitry;
independently activating a safety line of the safety lines, which is associated with a sensor connection of the sensor connections of the at least one safety sensor unit, by transmitting a line activation signal via the fieldbus by the at least one safety sensor unit;
directly receiving the line activation signal from the at least one safety sensor unit by the safety actuator unit via the fieldbus; and
independently executing the selected safety response, which is stored for an activated safety line of the safety lines in the safety configuration, by the safety actuator unit on reception of the line activation signal.

20. A safety-directed control system comprising:
at least one safety sensor unit;
at least one safety actuator unit, which is connected to one another via a fieldbus; and
processing circuitry,
wherein sensor connections for connecting safety sensors to the fieldbus are provided by the at least one safety sensor unit, and the sensor connections are associated with safety lines,
wherein the processing circuitry is configured to first display available safety lines of the safety lines to a user via an output interface,
wherein the processing circuitry is configured to, after displaying the available safety lines of the safety lines, receive a user input of the user via an input interface, with the user input associating a selected safety response from safety responses, which is executable by the safety actuator unit, with at least one selected safety line of the available safety lines,
wherein the processing circuitry is configured to, after receiving the user input associating the selected safety response with the at least one selected safety line, store the association between the at least one of the safety lines and the selected safety response in the safety actuator unit as a safety configuration,
wherein the safety lines associated with individual sensor connections of the sensor connections are configured to be independently activated by the at least one safety sensor unit by transmitting line activation signals of individual safety lines of the safety lines via the fieldbus,
wherein the safety actuator unit is configured to receive the line activation signals via the fieldbus directly from the at least one safety sensor unit, and
on reception of a line activation signal of the line activation signals of an activated safety line of the safety lines, to independently execute the selected safety response stored for the activated safety line in the safety configuration.

* * * * *